(12) United States Patent
Spaolonzi et al.

(10) Patent No.: US 7,453,367 B2
(45) Date of Patent: Nov. 18, 2008

(54) LEAK DETECTION SYSTEM AND METHOD FOR OFFSHORE HOSE LINES

(75) Inventors: Mauricio Pinto Spaolonzi, Sao Paulo (BR); Waldir Pereira de Lucena, Sao Paulo (BR); Luis Roberto Flores Sanches, Santana de Parnaiba (BR); Marcelo Martins Werneck, Rio de Janeiro (BR); Airton Domingos Moreno, Americana (BR); Cesar Cosenza de Carvalho, Rio de Janeiro (BR)

(73) Assignee: Veyance Technologies, Inc., Akron, OH (US)

( * ) Notice: Subject to any disclaimer, the term of this patent is extended or adjusted under 35 U.S.C. 154(b) by 113 days.

(21) Appl. No.: 11/299,883

(22) Filed: Dec. 12, 2005

(65) Prior Publication Data

US 2007/0131297 A1     Jun. 14, 2007

(51) Int. Cl.
G08B 21/00     (2006.01)
(52) U.S. Cl. .............................. 340/605; 340/603; 73/40
(58) Field of Classification Search ................. 340/605; 73/40
See application file for complete search history.

(56) References Cited

U.S. PATENT DOCUMENTS

| 2,759,175 A | 8/1956 | Spalding .................... 340/242 |
| 3,299,417 A | 1/1967 | Sibthorpe .................... 340/242 |
| 3,800,217 A | 3/1974 | Lowrance .................... 324/54 |
| 3,834,235 A | 9/1974 | Bouton et al. ................. 73/293 |
| 4,045,668 A * | 8/1977 | Pitt et al. ............... 250/227.25 |
| 4,153,079 A | 5/1979 | Ambrose .................... 138/104 |

(Continued)

FOREIGN PATENT DOCUMENTS

EP     0025344 A1     3/1981

(Continued)

OTHER PUBLICATIONS

European Patent Office, International Search Report issued in corresponding EP Application serial No. 06125705.1-1236 dated Apr. 18, 2008.

Primary Examiner—Jeff Hofsass
Assistant Examiner—Kerri L McNally
(74) Attorney, Agent, or Firm—Wood, Herron & Evans LLP

(57) ABSTRACT

A fluid leak detector is provided for a double carcass hose line segment and includes a sensor housing defined by sidewalls externally mounted to the hose line segment and having an internal housing chamber in communication with the collection space. An optical sensor is mounted through at least one sensor housing sidewall and positions an optical sensing element means within the sensor housing chamber for detecting a presence of fluid in the hose collection space. The optical sensor further includes analysis element means connecting to the optical sensing element means and positioned outside of the sensor housing one, wall, the analysis means generating data indicative of the fluid status within the hose collection space; and transmitter element means connecting to the analysis means for receiving data from the analysis element means and transmitting the data to at least one remote receiver. T optical sensing element means is electrically isolated from the analysis means and comprises at least one optical fiber positioned to make contact with fluid leaking into a collection space between the two carcasses of the hose.

8 Claims, 6 Drawing Sheets

U.S. PATENT DOCUMENTS

| | | | | |
|---|---|---|---|---|
| 4,159,420 A * | 6/1979 | Tsunoda | 250/227.25 |
| 4,259,553 A | 3/1981 | Tanaka et al. | 200/81 R |
| 4,270,049 A | 5/1981 | Tanaka et al. | 250/227 |
| 4,286,464 A | 9/1981 | Tauber et al. | 73/293 |
| 4,386,269 A | 5/1983 | Murphy | 250/227 |
| 4,465,105 A | 8/1984 | Slater | 138/104 |
| 4,509,558 A | 4/1985 | Slater | 138/104 |
| 4,568,925 A * | 2/1986 | Butts | 340/605 |
| 4,689,484 A * | 8/1987 | McMahon | 250/227.11 |
| 4,749,855 A * | 6/1988 | Watanabe | 250/227.11 |
| 4,764,671 A | 8/1988 | Park | 250/227 |
| 4,775,855 A * | 10/1988 | Cox | 340/605 |
| 4,862,426 A * | 8/1989 | Cassity et al. | 367/81 |
| 4,922,232 A | 5/1990 | Bosich | 340/605 |
| 4,932,257 A | 6/1990 | Webb | 73/40.5 |
| 4,961,069 A | 10/1990 | Tsaprazis | 340/619 |
| 4,973,946 A * | 11/1990 | Cowden, II | 340/605 |
| 5,005,005 A * | 4/1991 | Brossia et al. | 340/604 |
| 5,022,045 A | 6/1991 | Elliott | 374/20 |
| 5,058,420 A | 10/1991 | Vali et al. | 73/49.2 |
| 5,102,012 A | 4/1992 | Foster | 222/40 |
| 5,176,025 A | 1/1993 | Butts | 73/40 |
| 5,187,366 A * | 2/1993 | Hopenfeld | 250/302 |
| 5,200,615 A | 4/1993 | Hopenfeld | 250/302 |
| 5,244,016 A | 9/1993 | Kuroda et al. | 138/103 |
| 5,265,465 A * | 11/1993 | Thomas | 73/49.2 |
| 5,267,670 A | 12/1993 | Foster | 222/1 |
| 5,279,157 A | 1/1994 | Mattis et al. | 73/290 R |
| 5,279,332 A | 1/1994 | Winter et al. | 138/111 |
| 5,291,032 A | 3/1994 | Vali et al. | 250/577 |
| 5,305,798 A | 4/1994 | Driver | 138/98 |
| 5,333,230 A * | 7/1994 | Hata et al. | 385/110 |
| 5,343,736 A | 9/1994 | Cady et al. | 73/40 |
| 5,343,738 A * | 9/1994 | Skaggs | 73/40.5 R |
| 5,394,904 A | 3/1995 | Winter et al. | 138/137 |
| 5,399,876 A | 3/1995 | LaClair | 250/577 |
| 5,413,146 A | 5/1995 | Kuroda et al. | 138/104 |
| 5,427,155 A | 6/1995 | Williams | 138/103 |
| 5,452,076 A | 9/1995 | Schopper et al. | 356/128 |
| 5,551,484 A | 9/1996 | Charboneau | 138/104 |
| 5,553,971 A | 9/1996 | Osborne | 405/52 |
| 5,590,981 A | 1/1997 | Osborne | 405/154 |
| 5,654,499 A * | 8/1997 | Manuli | 73/40.5 R |
| 5,714,681 A * | 2/1998 | Furness et al. | 73/40.5 R |
| 5,775,842 A | 7/1998 | Osborne | 405/154 |
| 5,905,194 A | 5/1999 | Strong | 73/40.5 R |
| 6,026,862 A * | 2/2000 | Friedrich et al. | 138/112 |
| 6,032,699 A | 3/2000 | Cochran et al. | 138/104 |
| 6,070,617 A | 6/2000 | Honda et al. | 138/104 |
| 6,082,392 A | 7/2000 | Watkins, Jr. | 137/312 |
| 6,112,580 A | 9/2000 | Hesky | 73/49.1 |
| 6,116,817 A | 9/2000 | Osborne | 405/154 |
| 6,129,107 A | 10/2000 | Jackson | 137/312 |
| 6,161,591 A | 12/2000 | Winter et al. | 138/121 |
| 6,305,427 B1 | 10/2001 | Priest, II | 138/125 |
| 6,328,074 B1 | 12/2001 | Wright et al. | 138/137 |
| 6,374,863 B1 | 4/2002 | Friederich | 138/104 |
| 6,498,991 B1 | 12/2002 | Phelan et al. | 702/34 |
| 6,550,499 B1 | 4/2003 | Pai | 138/104 |
| 6,688,338 B2 | 2/2004 | Meli et al. | 138/123 |
| 2002/0134140 A1* | 9/2002 | Baumoel | 73/40.5 A |
| 2004/0154380 A1 | 8/2004 | Walker | 73/40.5 |
| 2004/0177891 A1 | 9/2004 | Spaolonzi et al. | 138/104 |
| 2004/0221642 A1* | 11/2004 | McCoy et al. | 73/40.7 |
| 2005/0264412 A1* | 12/2005 | Levesque et al. | 340/517 |

FOREIGN PATENT DOCUMENTS

| | | |
|---|---|---|
| EP | 0 535 997 A1 | 4/1993 |
| EP | 0695902 A1 | 2/1996 |
| EP | 1460408 A1 | 9/2004 |
| GB | 2 027 838 | 2/1980 |
| GB | 2099952 A | 12/1982 |
| JP | 8-261861 | 10/1996 |
| JP | 10-61900 | 3/1998 |
| JP | 11325378 | 11/1999 |
| JP | 2004-239612 | 8/2004 |
| WO | WO 90/00698 | 1/1990 |

* cited by examiner

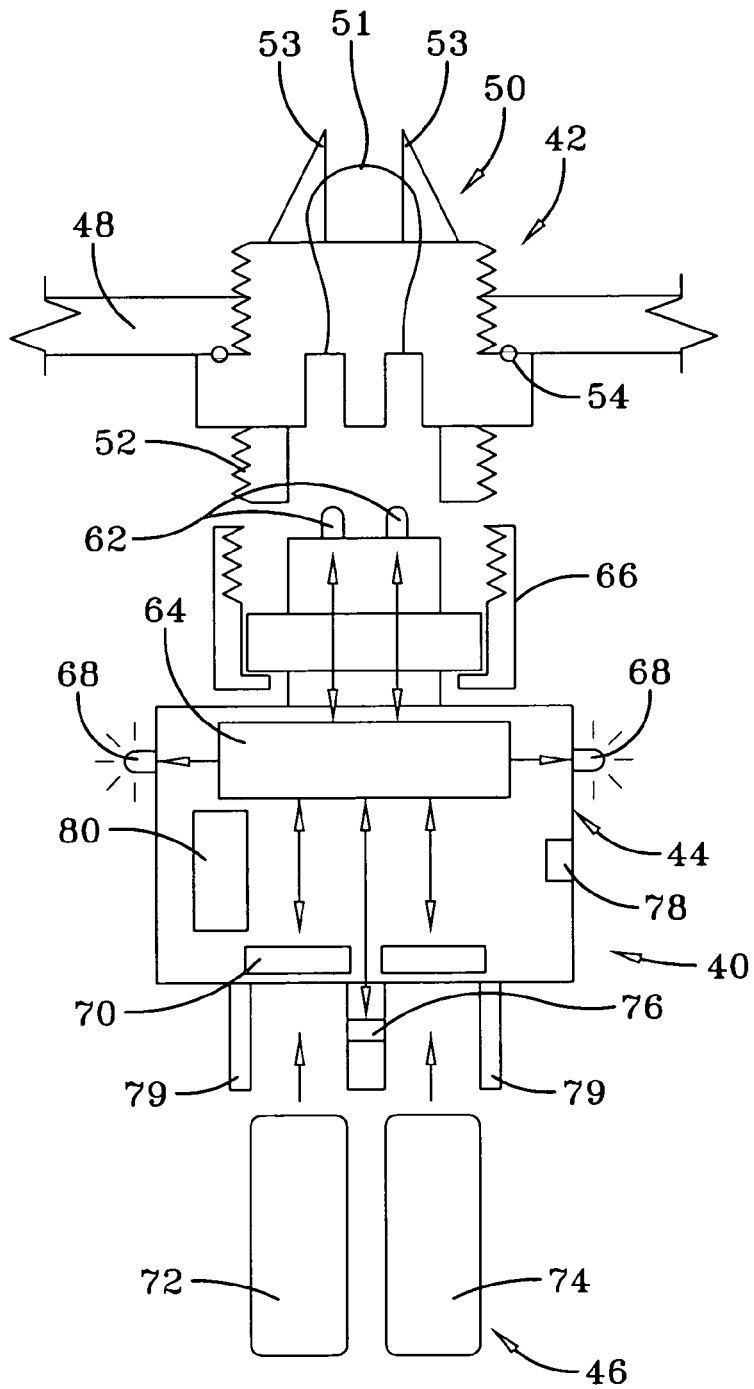
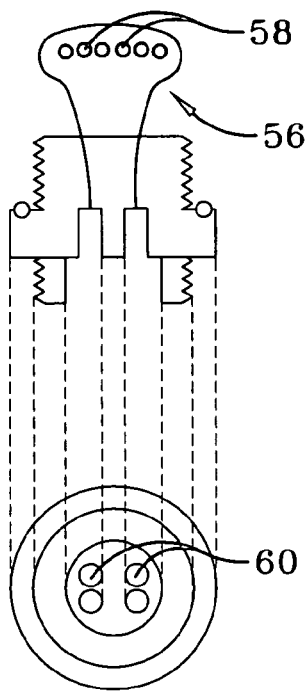
FIG-2
FIG-10A
FIG-10B

LEAK DETECTION SYSTEM AND METHOD FOR OFFSHORE HOSE LINES

FIELD OF THE INVENTION

The invention relates generally to offshore oil load and discharge terminals and, more specifically, to hose leak detection systems deployed within the context of such oil load and discharge terminals.

BACKGROUND OF THE INVENTION

In offshore oil load and discharge operations, there is a systematic risk of oil leakage to the sea from damage to single carcass submarine or floating oil suction and discharge hoses. As used herein, a "single carcass hose" is a hose construction comprising only one carcass layer. Leakage from a single carcass hose may from a precipitous hose failure or a failure that materializes over time. Hose failure may result from overpressure of the system, a puncture from outside, sudden tensile break of the hose body, defects in the manufacture, construction or design of the hose, etc. In a single carcass hose construction, hose failure results in immediate oil leakage to the environment surrounding the hose. Such leakage is highly undesirable for obvious environmental and economic reasons.

Because of the risk of failure inherent in single carcass hose construction, a "double carcass" hose construction has been proposed and developed by those in the industry. A double carcass hose construction utilizes an outer hose carcass confining an inner hose carcass as an added safeguard. The outer hose functions to hold any oil or fluid that leaks through the inner hose carcass for a certain designed period of time. In a typical double carcass construction, a hose includes a main pressure cord or carcass layer as a primary confinement and an outer, or auxiliary, pressure cord layer formed so as to sheathe the inner carcass. A buffering space is defined between the carcass layers to retain fluid that leaks from the inner carcass. In use, it is common to connect hoses end-to-end to form a hose line for transporting oil or other fluid under pressure. U.S. Pat. No. 5,244,016 discloses a hose representative of the state of the art double carcass construction.

A double carcass hose is generally produced and utilized in two different types: submarine or floating configurations, depending on the type of application and offshore oil load and discharge system. Submarine applications require that a hose extend in submerged fashion between two points whereas a floating application requires that the hose extend across the water surface. In either application, leakage from the hose results in the aforementioned undesirable consequences.

In order to minimize the damage resulting from an undetected leak, various leak detection systems have been proposed and adopted. Such systems generally employ leak detectors of various configurations, operable under varying principles, mounted at the nipple region of an underwater hose connection. U.S. Pat. No. 5,654,499 teaches a detector mounted to an end of a hose for detecting fluid upon contact between a sensing medium and the fluid. U.S. Pat. No. 4,465,105 teaches a pressure sensitive switch for detecting by means of pressure measurement the presence of fluid between carcass layers. U.S. Pat. No. 5,714,681 discloses an electro-optical sensor that utilizes an infrared beam that senses fluid levels when the beam is deflected.

Such devices and techniques, however, while working well, have certain disadvantages. First, the devices may be electrically unsafe in that they have active or power components within the oil collection space, creating a fire or explosion risk. Secondly, the communication systems in existing systems provide, at times, unreliable communication between the sensing elements and remote receivers. The positioning of the sensors may be affected by the floating hose line torsion when deploying the hose line into the water. The sensors may also be positioned incorrectly during hose line segment assembly. Finally hose lines move as a result of seawater conditions and such movement can cause sensor position change/failure, or cause a communication failure.

Additional deficiencies in existing art sensing systems are that they are relatively large, expensive to manufacture, cumbersome to deploy, and provide a less than satisfactory degree of reliability. Existing systems further are not readily repairable in the field. Also, existing sensor systems are susceptible to operational failure (emission and detection) as a result of magnetic interferences (EMI).

According, the industry is in need of a leak detector and system that is reliable, safe, efficient, and cost effective to manufacture, deploy, and maintain.

SUMMARY OF THE INVENTION

Pursuant to one aspect of the invention a fluid leak detector is provided for a hose line segment of the type comprising at least an inner carcass and an outer containment carcass separated from the inner carcass by a collection space. The detector includes a sensor housing defined by sidewalls externally mounted to the hose line segment and having an internal housing chamber in communication with the collection space. An optical sensor is mounted through at least one sensor housing sidewall and positions an optical sensing element means within the sensor housing chamber for detecting a presence of fluid in the hose collection space. The optical sensor further includes analysis element means connecting to the optical sensing element means and positioned outside of the sensor housing one wall, the analysis means generating data indicative of the fluid status within the hose collection space; and transmitter element means connecting to the analysis means for receiving data from the analysis element means and transmitting the data to at least one remote receiver.

Pursuant to another aspect of the invention, the optical sensing element means is electrically isolated from the analysis means and comprises at least one optical fiber disposed to contact fluid leaking into the collection space. According to yet a further aspect of the invention, the analysis element means propagates an optical signal through the one optical fiber and detects changes in at least one signal propagation characteristic as a result of fluid contacting the one optical fiber. In regard to another aspect of the invention, an elongate duct extends from the housing chamber to the hose collection space, the duct having a central axial passageway and the one optical fiber residing within the duct passageway.

According to another aspect of the invention, a method for detecting leaks in a double carcass hose is provided, of the hose type having at least an inner carcass and an outer containment carcass separated from the inner carcass by a collection space, the method including the steps: positioning at least one elongate duct between the inner and outer carcasses, the duct extending along the hose line and having an interior open duct end in communication with an annular space between the inner and outer carcasses and an exterior closed duct end; and mounting a fluid detection sensor at the closed end of the duct, the sensor operationally utilizing the duct passageway for sensing the presence of fluid within the annular space between the inner and outer carcasses.

These and other embodiments and aspects of the invention, which will be apparent to those skilled in the art, are achieved by a preferred and an alternative embodiment that is described in detail below and illustrated in the accompanying drawings.

BRIEF DESCRIPTION OF THE DRAWINGS

The invention will be described by way of example and with reference to the accompanying drawings in which:

FIG. 2 is a schematic representation of the sensor in a leak detector configured pursuant to the invention.

FIG. 10A is a schematic of an alternative sensing element.

FIG. 10B is a plan view of the alternative sensing element of FIG. 10A.

DETAILED DESCRIPTION OF THE PREFERRED EMBODIMENTS

Figure 1:
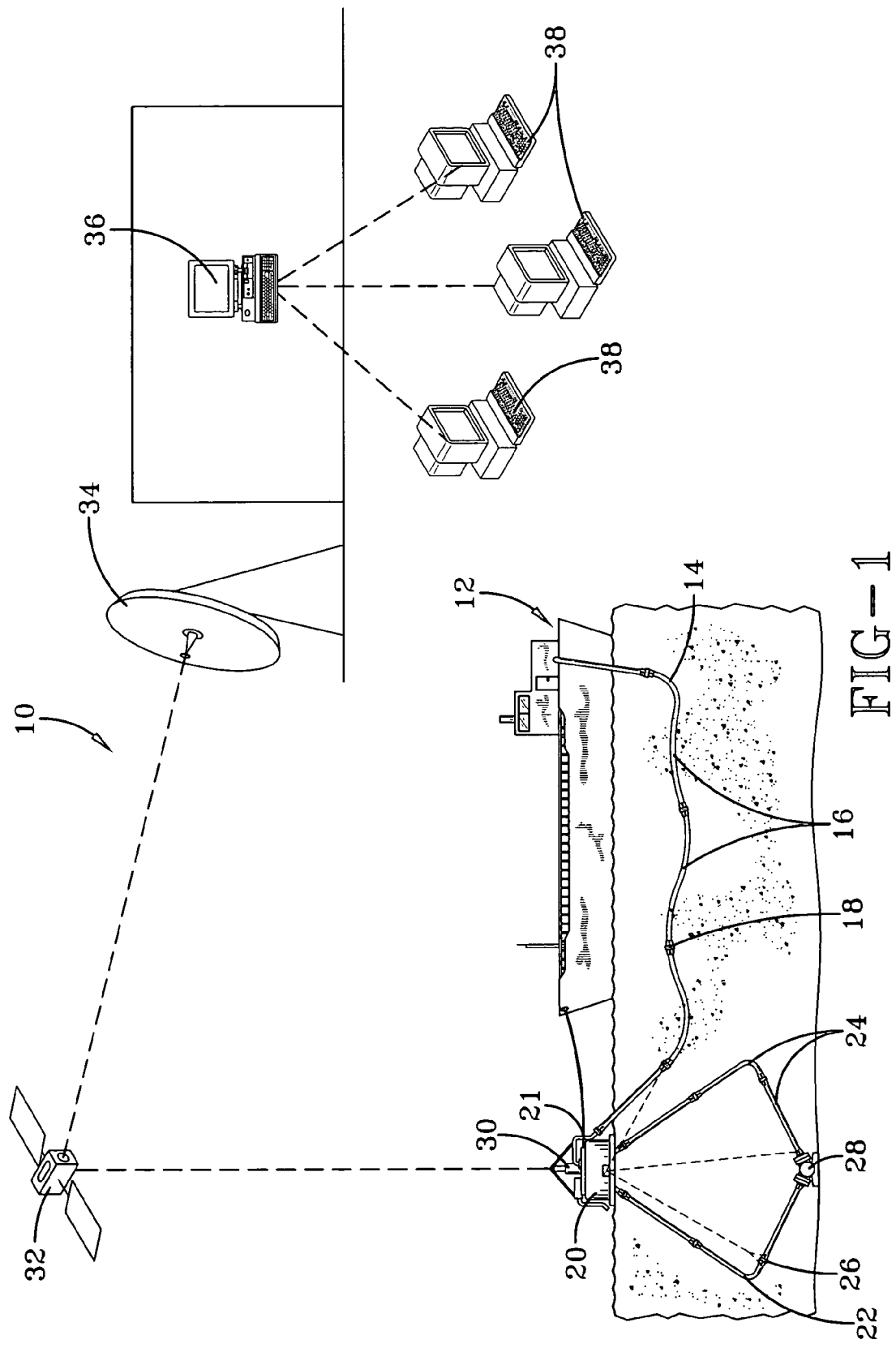
FIG. 1 is a schematic representation of the subject invention in an offshore oil loading and discharge terminal communicating via satellite with remote monitoring stations.
Figure 3:
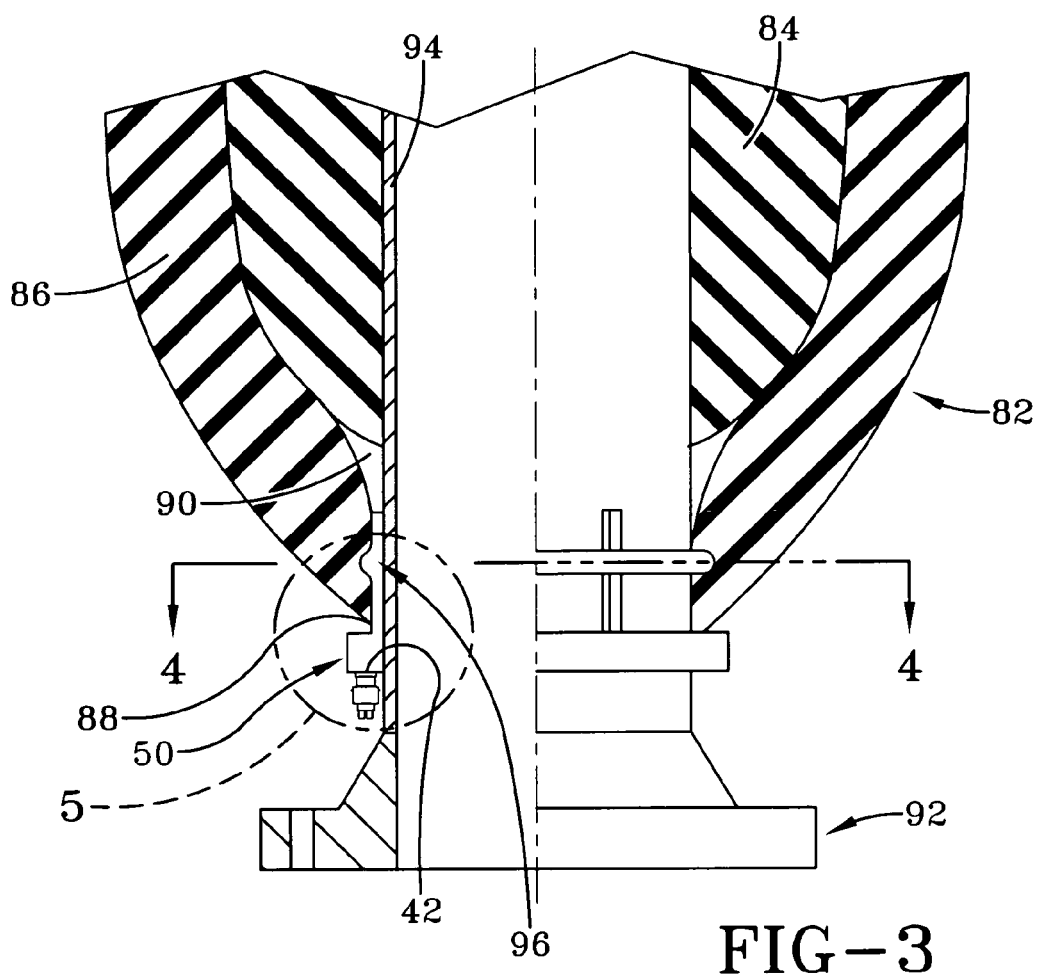
FIG. 3 is a cross section through a double carcass hose at a nipple end showing a leak detector attached pursuant to the invention.
Figure 4:
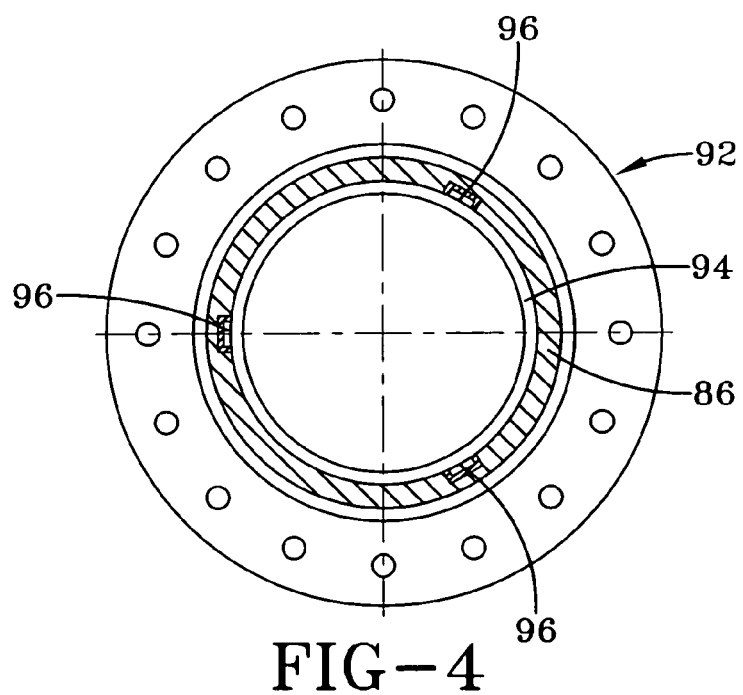
FIG. 4 is a section view through the hose and leak detector of FIG. 3 taken along the line 3-3.
Figure 5:
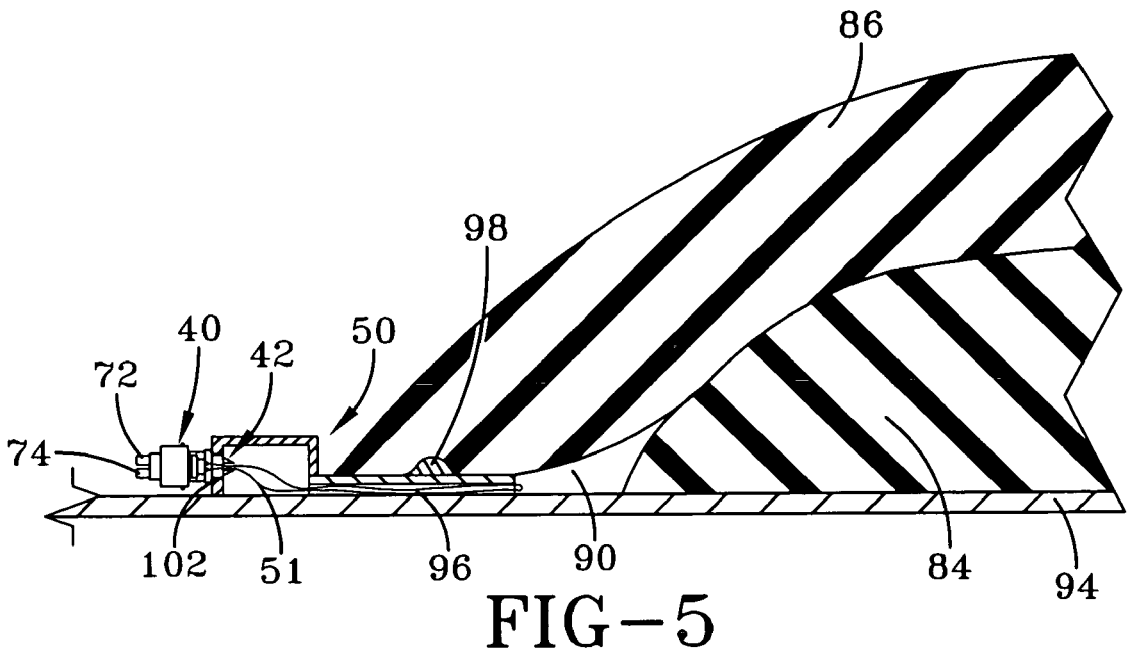
FIG. 5 is a longitudinal section view through a double carcass hose at a nipple end showing a leak detector configured pursuant to the invention in a sidewall mounting mode.
Figure 6:
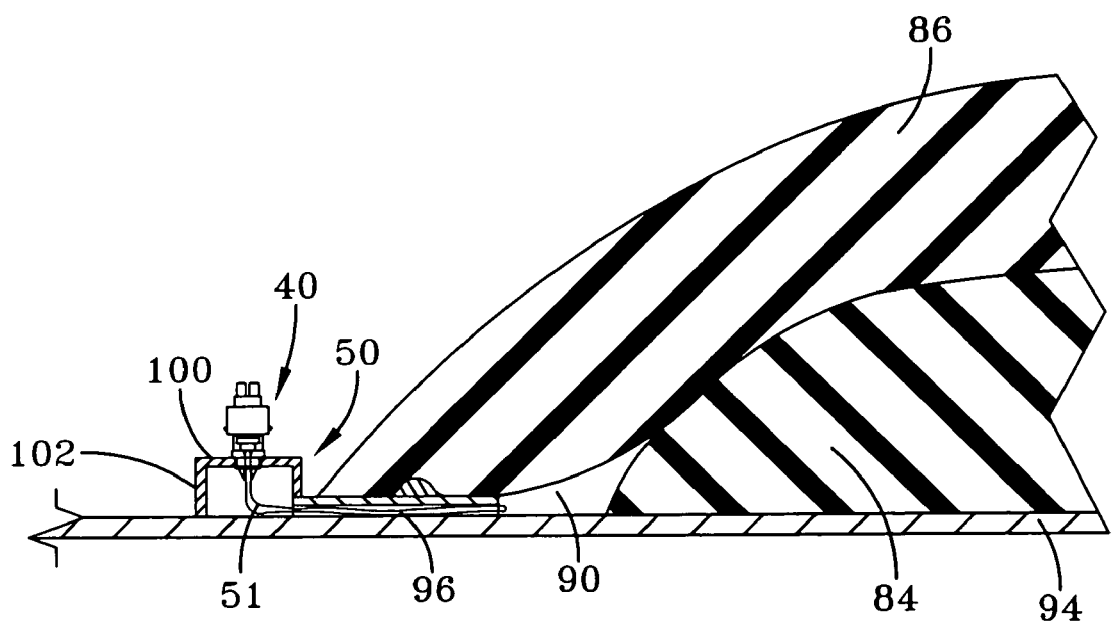
FIG. 6 is a longitudinal section view through a double carcass hose at a nipple end showing a leak detector configured pursuant to the invention in an end wall mounting mode.

Referring initially to FIG. 1, an offshore oil loading and discharge terminal is depicted by way of example incorporating a double carcass hose with built-in electronic remote oil leak detection system 10 configured pursuant to the subject invention. The offshore oil loading and discharge terminal of FIG. 1 is but one of many applications for the invention and the invention is not intended to be limited thereto. Any application in which a double carcass hose is utilized for the transportation of a fluid can utilize the subject leak detection system and the teachings herein set forth.

The representative field application of FIG. 1 is schematically represented by a tanker or platform 12. Extending from the tanker 12 is a network of submerged hose lines 14 comprising end to end connected hose segments 16 joined together by a coupling 18. Hose lines 14, while illustrated as submersible, may also be configured as floating lines if desired for an intended application. The submerged lines 14 extend to a buoy 20 and connect thereto by a coupling 21. Submarine hose lines 22 depend from buoy 20 and comprise hose segments 24 connected end to end by couplings 26. Submarine hose lines 22 terminate at a pump station 28. Oil is pumped from station 28 upward through hose lines 22 to the lines 14 and therein to the tanker 12. Pursuant to the invention, as explained in detail below, leak detection sensors are disposed within the hose lines 14 and 22 to detect fluid leakage and prevent the fluid from escaping into the sea. Preferably, although not necessarily, each hose segment is provided with two sensors, one at each end. More or fewer sensors per hose line or hose line segment may be deployed if desired.

A transmitter 30 may be mounted to the buoy 20 and coupled to the sensors in each hose segment 24. Data indicating the leak status of each hose segment is communicated to the transmitter and transmitted via satellite 32 to a central data processor/receiver 36 connected to antenna 34. The receiver 34 distributes the data to one or more decentralized remote terminal locations 38 so that the status of the hose lines 14, 22 may be monitored.

A representative electro-optic embodiment of a fluid detection sensor 40 is shown in FIG. 2. While the embodiment illustrated is a preferred form for the sensor 40, the subject invention is not intended to be so limited. Other forms of sensors and associated circuitry for detecting the presence of fluid and generating a warning signal in the event of leak detection, that will be apparent to those skilled in the art, may be deployed if desired. The form of detector 40 shown FIG. 2 represents one embodiment for performing the desired fluid detection function.

With continued reference to FIG. 2, the detector or sensor 40 comprises a sensing element 42; an analysis element 44, and a transmission element 46. The sensor 40 affixes through a sensor housing wall 48 and communicates at the sensing element 42 with an interior of the sensor housing 50. One or more optical fibers 51 are connected to extend into the housing 50. The sensing fiber 51 in FIG. 2 is in the form of a continuous loop. Insertion of the sensor 40 through the wall 48 is facilitated by spaced apart lead-in protrusions 53 that serve to protect the fiber 51. The body of the sensing element 42 is generally cylindrical and externally threaded at 52. Sensing element 42 is thus screwed into the sensor housing wall 48, preferably at the nipple passage duct of a hose segment terminal end. An O-ring 54 seals the passage duct into the housing 50. The sensing part, fiber 51, stays inside the housing 50 and the analysis element 44 stays outside the housing 50. Analysis element 44 is according maintained outside the hose at the nipple portion that contacts air or water, depending on whether the hose is submerged or floating. The sensing element 42 is totally sealed and does not contain any batteries or power source.

FIGS. 10A and 10B show an alternative embodiment 56 to the sensing element 42 in which a plurality of fibers 58 is used to sense the various layers of a double carcass hose. The sensing element 56 in the alternative form has the plurality of coated optical fibers 58 wound in a spiral manner inside the carcasses of a hose. By way of example, one spiral may be deployed for the first carcass; one for the second carcass; and one for the buoyancy foam and the outer cover; and one for the space in between the carcass. Whenever there is a catastrophic rupture of one or more carcasses, the optical fibers will also break, indicating a system failure. The sensing element 56, as shown in elevation in FIG. 10B, has four or more holes 60 that receive the optical fiber ends.

With reference to FIG. 2, one or more optical actuators 62 are provided that match the ends of the optical fibers 58 (alternative embodiment of FIG. 10) or 51 (embodiment of FIG. 2). A central control unit (electronics) 64 is provided in the analysis element 44. The electronic control unit 64 optically drives the fiber 51 by means of actuators 62. A threaded screw ring 66 mechanically couples the analysis element 44 to the sensing element 42. The transmission of the analysis element 44 may be by a "watch dog" status that indicates the primary systems are functioning normally and an "alarm" status that indicates that a leak or carcass rupture (or both) have occurred and are detected. The status modes may be shown by visual status indicators 68 and may be transmitted by ultrasonic or radio frequency signals to a data collection platform (DCP). When the fiber optic sensor 42 detects the presence of oil and/or a carcass rupture, the visual status indicators 68 change pattern. In the meantime, magnetic actuators 70 may be employed to turn the transmission element 46 on. A presence indicator 76 indicates to the analysis element 44 which of the transmitters is engaged. A magnetic switch 78 turns the analysis element on. Immediately the analysis element starts to monitor, detect, or transmit the status patterns. The analysis element is fully sealed and can be installed, removed or replaced under water and is powered by batteries 80.

With continued reference to FIG. 2, the transmission element 46 will be explained. The magnetic actuators 70 are coupled to the ultrasonic transmitter 72 and RF transmitter 74 and either or both may be deployed and activated in the event that a leak or carcass rupture is detected. The transmitters can be engaged into the analysis element 44 through fixing rings 79. When a transmitter is engaged into the control element, the transmitter presence detector 76 indicates to the central control unit 64 that there is a transmitter engaged into the analysis element 44. Whenever the analysis element decides to transmit the alarm status or watchdog status, the correspondent magnetic actuator 70 is turned on by the central control unit 64. The transmitters 72, 74 are fully sealed and incorporated their own batteries in a conventional manner that allows the batteries to be installed, removed or replaced under water.

In principle, the optical sensor 40 operates as follows. The geometrical structure of an optical fiber 51 consists of a concentrically arranged cylindrical core and sheath. The fiber 51 may be composed of any suitable material providing the necessary optical transmission properties. It is preferred, although not necessary, that the core be composed of optical plastic material so that breakage of the risk of fiber breakage in the hose may be minimized Light is propagated through the core and is almost entirely spatially confined therein. The core typically possesses an index of refraction greater than the sheath such that propagated light is confined within the core by means of reflection at the core to sheath interface. However, a part of the propagating energy always extends beyond the sheath decreasing in amplitude in an exponential manner along the radial coordinates. The part of light extending beyond the sheath is termed evanescent field. The sheath of the optical fiber may be sufficiently thin or have its thickness decreased in such a manner that the evanescent field becomes externally exposed. Light may then experience the phenomena of optic tunneling through the sheath and interact with the outside environment.

Alternatively, the sheath of the optical fiber may be removed to expose the core. The external medium then assumes the role of the sheath. In either configuration, light may interact with the external medium and this interaction is termed evanescent-field coupling. A sensitive fiber may be placed, therefore, in contact with a surrounding medium, such as leakage fluid from a double carcass hose. The moment the fluid touches the optical fiber outer surface it initiates a change in the coefficient of attenuation and index of refraction with time and the surface or volume of the fluid. The evanescent-field extends in significant amplitude which characterizes interaction between the fiber and the light fluid.

The optical signal through the evanescent field shall experience a temporal variation of the average index of refraction and the attenuation coefficient due to the intrinsic absorption of the medium and spreading because of the spatial fluctuations of the index of refraction. The reduction of the optical power transmitted through the fiber is related to the volume of fluid present in the volume occupied by the evanescent-field around the optical fiber. The characteristics of light that may be affected by fluid contacting the fiber core are: amplitude (intensity), complete phase, wavelength or polarization. By measuring one or more of such characteristics, and the change in the characteristic, it can be determined that a fluid is in contact with the optical fiber. The optical fiber is therefore an in-line component in an optical circuit and an optical signal may be analyzed. Analysis of changes in average optical power (amplitude or intensity); phase (advance or delay of phase); reflected and/or transmitted spectrum (wavelength); polarization and shape/temporal or spectral parameterization of the optical pulses enables a determination to be made as to the presence of fluid against the optical fiber.

With reference to FIGS. 3, 4, 5, and 6, a double carcass hose 82 is depicted consisting of an inner carcass 84, an outer carcass 86 extending to a carcass forward end 88, and a collection space between the carcass layers 84, 86. A connector 92 is affixed to each end of the hose 82 and includes a nipple or sleeve 94 that is positioned along the axial inner surface of the inner carcass 84. Pursuant to the invention, an elongate fluid duct 96 is positioned to extend along the outside of the nipple 94 parallel with the axis of the hose 82. The duct 96 includes an annular anchoring bead 98 that mechanically connects the duct into the outer carcass layer 86 proximate forward end 88. The housing 50 is shown to include a top-wall 100 and a forward end wall 102. As will be appreciated from a combined consideration of FIGS. 2, 5, and 6, the sensor 40 is intended to mount either in the forward wall 100 (FIG. 6) or, optionally, in end wall 102 (FIG. 5) of the housing 50.

It will be noted that the sensor 40 protrudes through and is mounted through a wall of the housing 50. The sensor analysis element 44 and transmission element 46 are outside of the mounting wall and sealed from the interior of the housing 50 as described previously. The sensing element 42 projects into the housing 50 and the optical fiber (or plural fibers) 51 extends from the sensing element 42 through the housing 50 and down the duct 96 to the collection space 90. While one duct and sensor assembly is shown, a plurality of sensors may be positioned about the periphery of the house, each having an associate duct 96. The fiber (or fibers) 51 preferably protrude from a forward end of the duct 96.

Functionally, fluid leakage from the inner carcass 84, or water entering the hose as a result of a breach in the outer carcass, will migrate into the collection space 90, eventually surrounding the carcass space 90 and reaching the open end of duct 96 within the space 90. At this location, the escaping oil, or water, will contact the fiber 51. Contact between the fiber outer coating and the fluid will alter the transmission properties carried by the fiber 51 and be interpreted by the control unit 64 as a leak. The control unit 64 will then initiate a change in communication to signal the breach by means of the ultrasonic transmitter 72 and/or the RF transmitter 74. A visual indicator change at visual indicator 68 will also be initiated.

It will be noted that the optical sensing element 42 is passive, and does not have or need an active energy supply, making the element 42 intrinsically safer when contacting oil than other forms of sensing devices. The wall 48 through which the sensor 40 mounts thus functionally isolates the passive sensing element 42 from the battery powered analysis element 44 and transmission elements 46. Moreover, the system is relatively light and occupies minimal space. The insertion and connection of the duct 96 and system hardware is readily accomplished and the system elements 42, 44, 46 are readily repairable in the event of a malfunction. The optical fiber operates as a contacting medium for detecting the presence of fluid and is a reliable means for detecting the presence and identity of fluid in the space 90. The analysis element 44 has durable long duration batteries 80. The element 44 operates continuously without need for a timer and functions preferably using artificial intelligence or neural network software. The transmission elements 46 include built-in replaceable batteries and ID chips. When data is collected and transmitted, the identity of the sensor/hose segment is provided with the data to a remote receiver. Corrective action to repair the leaking hose can then be taken. The transmission elements 72, 74 work under magnetic principle with no electrical contacts.

Figure 7:
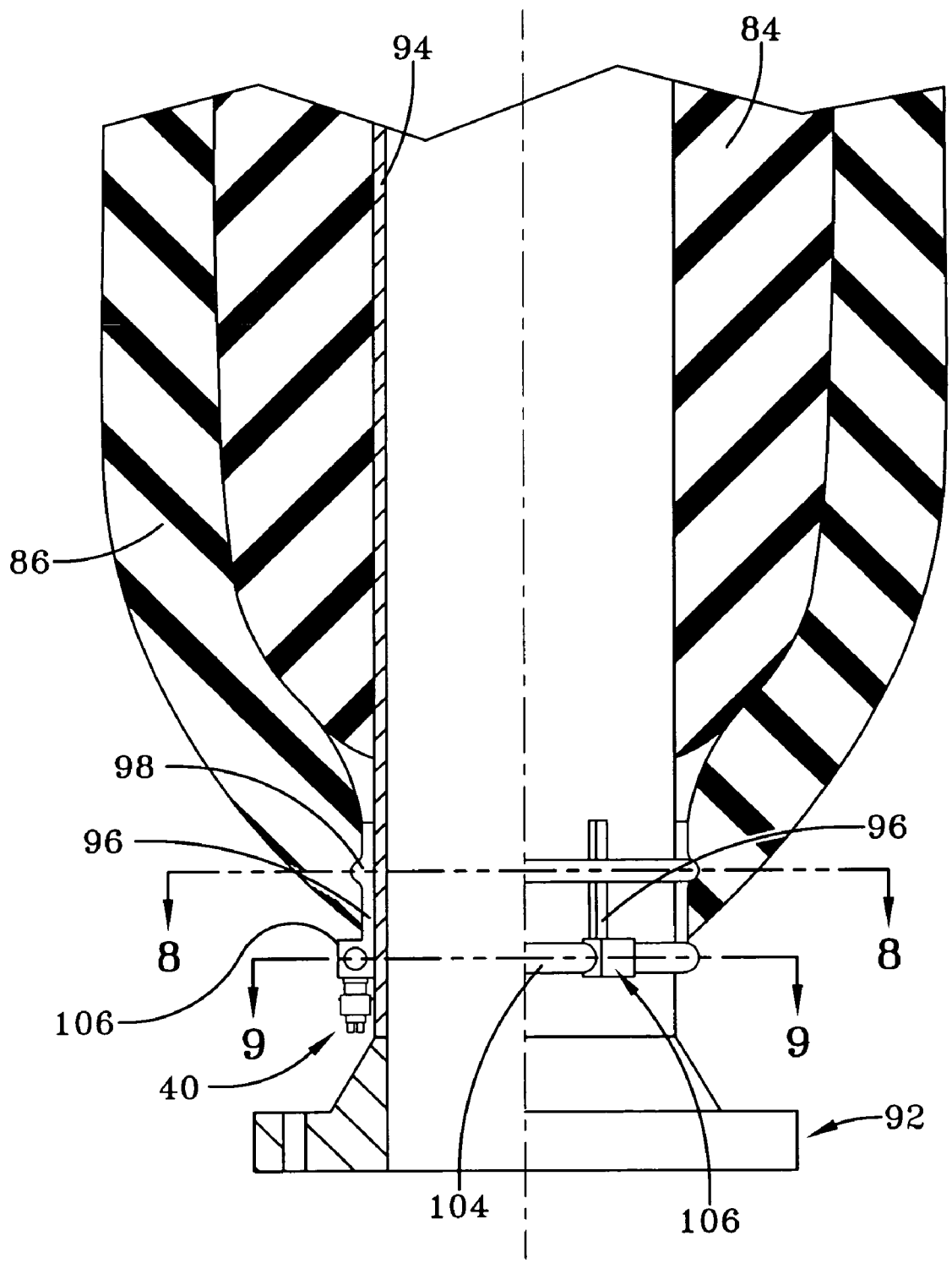
FIG. 7 is a section view through a double carcass hose at a nipple end showing an alternative embodiment of a leak detector configured pursuant to the invention.
Figure 8:
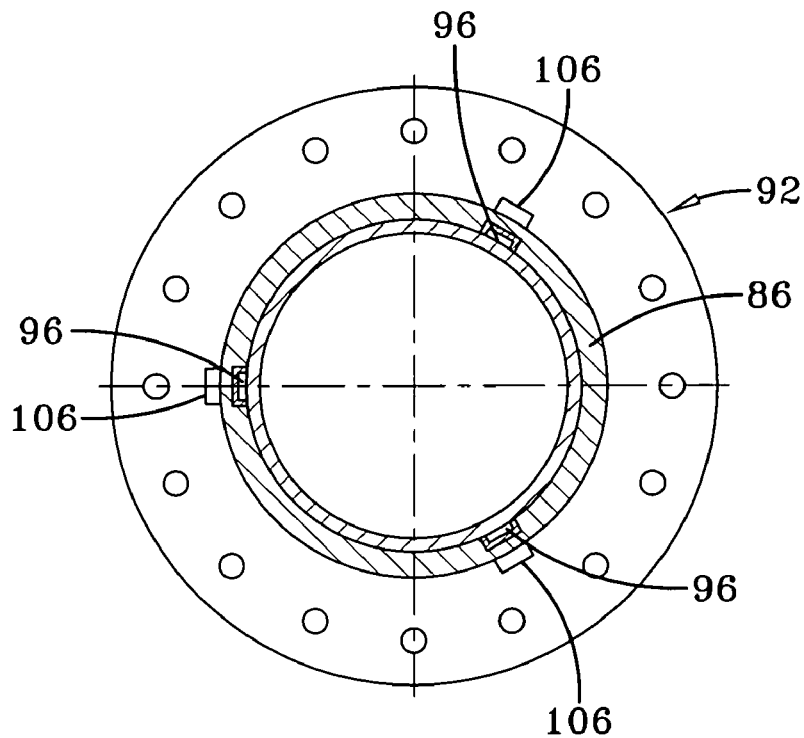
FIG. 8 is section view through the hose and leak detector of FIG. 7 taken along the line 8-8.
Figure 9:
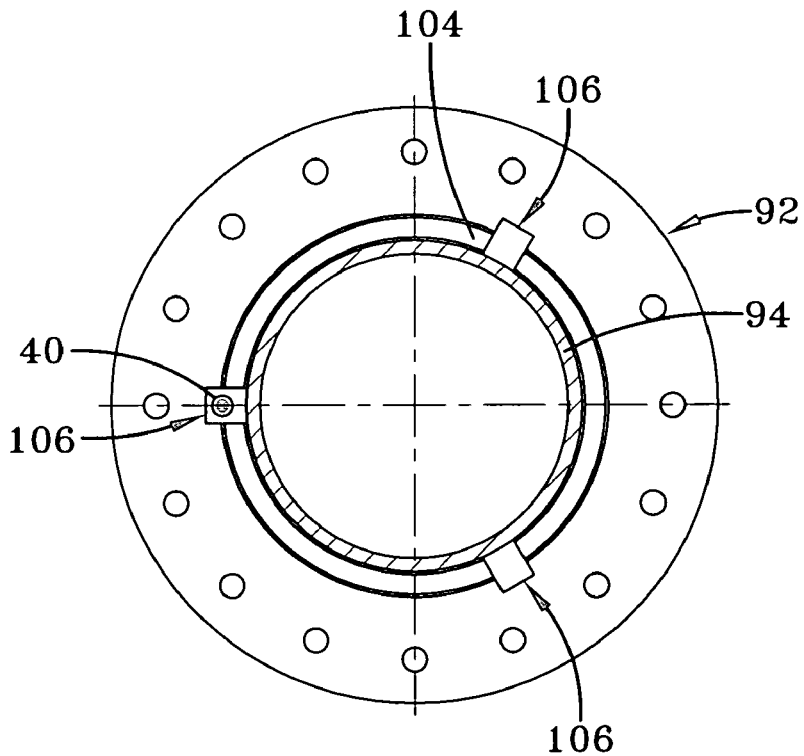
FIG. 9 is a section view through the hose and leak detector of FIG. 7 taken along the line 9-9.

FIGS. 7, 8, 9 show a second embodiment of the subject invention in which a circumferential vent pipe 104 is interposed at the outward end of the fluid duct or ducts 96. The internal chamber of the vent pipe 104 communicates with the duct 96 and provides for the evacuation of air from the duct 96, whereby allowing leaking fluid to migrate up the duct 96 to connector housing 106. The sensor 40 may thus be mounted into the sensor housing 106 and the optical fiber 51 of sensing element 42 projects into the housing 106. In this embodiment, the fiber 51 does not travel the length of duct 96 but rather remains in housing 106 for the fluid to migrate up the duct 96. The vent pipe 104 allows for the evacuation of air from the duct 96 as the fluid works its way up the duct or ducts 96. As before, more than one duct 96 may be employed and each duct may share a common vent pipe 104. It will be noted that in the alternative embodiment the sensing element 42 within housing 106 resides beyond the forward end of the hose 88. Should any failure or breakage of the optical fiber 51 occur, the shorter loop of fiber 51 in the alternative embodiment is easily removable from the housing 104 with the removal and replacement of sensor 40.

With reference to FIG. 1, a sensor may be associated at the end of each of the hose segments 24, 16 with a unique identification number signifying its location. Upon detection of a leak, the sensor 40 communicates by means of RF transmission, ultra-sound, or other known communication devices to a receiver/transmitter 30 on the buoy. Transmitter 30 transmits the data via satellite 32 and receiving antenna 34 to a central control 36. The information is then relayed to remote terminals 38. The subject system may alternatively communicate via the internet to remote monitoring locations. Still further, the satellite 32 may be part of the global positioning system (GPS) whereby the location of each sensor in each hose segment can be precisely pinpointed by the GPS. Whenever a leak occurs, the sensor detecting the leak may communicate to remote terminals by GPS channels. The leak status of all the hose segments and lines may thus be monitored from multiple locations so that detection of a leak and an expeditious initiation of repair can be made.

From the forgoing, it will be appreciated that the subject sensor system for double carcass hose lines affords significant advantages. First, the device is electrically and intrinsically safe in that no electrical energy is stored or used inside the oil collection space 90. All power sources for the analysis element 44 and the transmission elements 46 are outside the collection space and are totally sealed off and isolated by the intervening wall 48. The system employs redundant communication means such as at transmitters 72, 74. Electrical fields formed in the hose do not affect the electronic components of the analysis element 44 and the transmitter elements 72, 74 are galvanically insulated from the analysis element 44. Sensor ID is done through the transmitter elements 46 rather than the analysis element 44. The invention thus provides a system and optical sensor that are reliable, safe, efficient, and cost effective to manufacture, deploy, and maintain.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A fluid leak detector for a hose line segment of the type comprising at least an inner carcass and an outer containment carcass separated from the inner carcass by a collection space, the detector comprising:

a sensor housing defined by sidewalls externally mounted to the hose line segment and having an internal housing chamber in communication with the collection space;

an optical sensor extending through at least one of the sidewalls of the sensor housing;

the optical sensor having an optical sensing element positioned within the sensor housing chamber for detecting a presence of fluid in the hose collection space, wherein the optical sensing element comprises an optical fiber disposed to contact fluid within the collection space;

an analysis element connecting to the optical sensing element and positioned outside of the sensor housing sidewalls, the analysis element configured to generate data indicative of the fluid status within the hose collection space;

a transmission element connecting to the analysis element for receiving data from the analysis element and transmitting the data to at least one remote receiver; and an elongate duct extending from the housing chamber to the hose collection space, the duct having a central axial passageway and the optical fiber residing within the duct passageway, wherein the optical sensing element is electrically isolated from the analysis element.

2. A fluid leak detector for a hose line segment of the type comprising at least an inner carcass and an outer containment carcass separated from the inner carcass by a collection space, the detector comprising:

a sensor housing defined by sidewalls externally mounted to the hose line segment and having an internal housing chamber in communication with the collection space;

an optical sensor extending through at least one of the sidewalls of the sensor housing;

the optical sensor having an optical sensing element positioned within the sensor housing chamber for detecting a presence of fluid in the hose collection space, wherein the optical sensing element comprises an optical fiber disposed to contact fluid within the collection space;

an analysis element connecting to the optical sensing element and positioned outside of the sensor housing sidewalls, the analysis element configured to generate data indicative of the fluid status within the hose collection space;

a transmission element connecting to the analysis element for receiving data from the analysis element and transmitting the data to at least one remote receiver;

an elongate duct extending from the housing chamber to the hose collection space, the duct having an axial passageway for conveying leakage fluid from the collection space to the housing chamber, wherein the optical fiber resides within the housing chamber; and an annular venting pipe extending circumferentially around the hose proximate to the sensor housing, the venting pipe having a central passageway communicating with the duct passageway for venting air from the duct passageway, wherein the optical sensing element is electrically isolated from the analysis element.

3. A fluid leak detector for a hose line segment of the type comprising at least an inner carcass and an outer containment carcass separated from the inner carcass by a collection space, the detector comprising:

at least one elongate duct having an axial internal passageway, the duct disposed to extend parallel to a longitudinal axis of the hose line, the duct having an interior open duct end in communication with an annular collection space between the inner and outer carcasses and an exterior closed duct end and the duct having an opposite end terminating at a central chamber within a sensor housing;

a fluid detection sensor extending through at least one sidewall of the sensor housing, the fluid detection sensor having an optical sensing element positioned within the sensor housing chamber for detecting a presence of fluid in the hose collection space; an analysis element connecting to the optical sensing element and positioned outside of the sensor housing sidewall, the analysis element generating data indicative of the fluid status within the hose collection space; and a transmission element connecting to the analysis element for receiving data from the analysis element and transmitting the data to at least one remote receiver, wherein the optical sensing element is electrically isolated from the analysis element.

4. A leak detector according to claim 3, wherein the optical sensing element includes at least one optical fiber positioned axially within the duct passageway to the collection space.

5. A leak detector according to claim 4, further comprising an elongate circumferentially extending venting pipe having an internal passageway in communication with the duct passageway, the venting pipe operationally evacuating air from the duct to allow the migration of leaking fluid from the open duct end toward the closed duct end.

6. A method for detecting leaks in a double carcass hose of the hose type having at least an inner carcass and an outer containment carcass separated from the inner carcass by a collection space, comprising:

a. positioning at least one elongate duct between the inner and outer carcasses, the duct extending along the hose line and having an interior open duct end in communication with an annular space between the inner and outer carcasses and an exterior closed duct end;

b. mounting a fluid detection sensor at the closed end of the duct, the sensor operationally utilizing the duct passageway for sensing the presence of fluid within the annular space between the inner and outer carcasses;

c. positioning at least one optical fiber of the sensor axially into an elongate duct passageway; and d. protruding a remote end of the optical fiber from the duct into the collection space.

7. A method according to claim 6, further comprising:

positioning an elongate circumferentially extending venting pipe having an internal passageway in communication with the duct passageway; and utilizing the venting pipe to evacuate air from the duct to allow the migration of fluid through the duct from the collection space to the fluid detector.

8. A method according to claim 6, wherein the fluid detector comprises an optical sensing element positioned within a sensor housing central chamber at an outward end of the duct, the central chamber communicating with the duct passageway, and the fluid detector further comprising:

an analysis element for generating data indicative of the fluid status within the hose collection space; and a transmission element connecting to the analysis element for receiving data from the analysis element and transmitting the data to at least one remote receiver.

* * * * *